(12) United States Patent
Onishi

(10) Patent No.: US 7,082,199 B2
(45) Date of Patent: Jul. 25, 2006

(54) SIMPLE ENCRYPTED TRANSMISSION SYSTEM SUITABLE FOR INTERMITTENT SIGNALS

(75) Inventor: Kazumi Onishi, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1084 days.

(21) Appl. No.: 09/924,443

(22) Filed: Aug. 9, 2001

(65) Prior Publication Data

US 2002/0090088 A1    Jul. 11, 2002

(30) Foreign Application Priority Data

Jan. 11, 2001  (JP)  ............................. 2001-003467

(51) Int. Cl.
*H04L 9/00*  (2006.01)
(52) U.S. Cl.  ........................... 380/268; 380/44; 380/47; 713/171
(58) Field of Classification Search  ............ 380/44–46, 380/262, 264, 268, 277–285; 713/171; 726/1–36; 455/69–70, 502; 370/394
See application file for complete search history.

(56) References Cited

U.S. PATENT DOCUMENTS

| 4,125,744 | A | * | 11/1978 | Goodall | ........................ | 380/27 |
| 4,893,339 | A | * | 1/1990 | Bright et al. | .................. | 380/28 |
| 5,204,903 | A | * | 4/1993 | Okada et al. | ................. | 380/46 |
| 5,696,826 | A | * | 12/1997 | Gao | ............................ | 380/28 |
| 5,809,147 | A | * | 9/1998 | De Lange et al. | ............ | 380/28 |

FOREIGN PATENT DOCUMENTS

JP          05007202          1/1993

* cited by examiner

*Primary Examiner*—Matthew Smithers
*Assistant Examiner*—Minh Dieu Nguyen
(74) *Attorney, Agent, or Firm*—Venable LLP; Michael A. Sartori; Kavita B. Lepping

(57) ABSTRACT

A signal transmitted from a first device to a second device is encrypted using an encryption key generated from a preceding part of the signal itself. The signal is decrypted in the second device using a decryption key generated from a preceding part of the received and decrypted signal. This encryption method provides effective privacy protection, because the encryption and decryption keys are constantly changing. Since the transmitted signal provides its own encryption and decryption keys, the method is inexpensive to implement, and can be used in systems such as packet transmission systems that transmit signals intermittently.

4 Claims, 9 Drawing Sheets

SIMPLE ENCRYPTED TRANSMISSION SYSTEM SUITABLE FOR INTERMITTENT SIGNALS

BACKGROUND OF THE INVENTION

The present invention relates to a system that encrypts and decrypts signals, and transmits and receives the encrypted signals, more particularly to a system, such as a packet transmission system, in which the encrypted signals are transmitted intermittently.

One well-known type of encrypted transmission system has the general structure shown in FIG. 8, comprising a first device 220 and a second device 280 linked by a communication channel 300. The communication channel 300 may be a wireline link comprising copper wire, optical fibers, or the like, or a wireless link comprising radio waves, infrared beams, or the like.

The first device 220 has a transmitting section and a receiving section. The transmitting section includes a scrambling circuit 221 that scrambles a transmit signal A to obtain a scrambled signal CA, a pseudo-random pattern generating circuit 222 that supplies a pseudo-random pattern RA1 to the scrambling circuit 221, and a transmitting circuit 223 that transmits a modulated signal MCA, modulated by the scrambled signal CA. The receiving section includes a receiving circuit 230 that receives and demodulates a modulated signal MCB to obtain a scrambled signal CB, a descrambling circuit 231 that descrambles the scrambled signal CB to obtain a receive signal B, and a pseudo-random pattern generating circuit 232 that supplies a pseudo-random pattern RA2 to the descrambling circuit 231.

The second device 280 also has a transmitting section and a receiving section. The transmitting section includes a scrambling circuit 281 that scrambles a transmit signal B to obtain a scrambled signal CB, a pseudo-random pattern generating circuit 282 that supplies pseudo-random pattern RA2 to the scrambling circuit 281, and a transmitting circuit 283 that transmits the modulated signal MCB, which is modulated by the scrambled signal CB. The receiving section includes a receiving circuit 290 that receives and demodulates the modulated signal MCA to obtain a scrambled signal CA, a descrambling circuit 291 that descrambles the scrambled signal CA to obtain a receive signal A, and a pseudo-random pattern generating circuit 292 that supplies pseudo-random pattern RA1 to the descrambling circuit 291.

When signal A is transmitted from the first device 220 to the second device 280, the scrambling circuit 221 uses the pseudo-random pattern RA1 supplied by the pseudo-random pattern generating circuit 222 to alter the contents of signal A in a seemingly random fashion, typically by taking the exclusive logical OR of corresponding bits of A and RA1. As a result, if the modulated signal MCA is intercepted by a third party, the intercepted signal is unintelligible. The descrambling circuit 291 uses the same pseudo-random pattern RA1, supplied by the pseudo-random pattern generating circuit 292, to perform the reverse alteration on the scrambled signal CA (typically by performing another exclusive logical OR operation), thereby obtaining the original signal A.

When signal B is transmitted from the second device 280 to the first device 220, it is similarly scrambled and descrambled, using pseudo-random pattern RA2, which may differ from pseudo-random pattern RA1.

In the system in FIG. 8, the pseudo-random patterns RA1, RA2 are hard-wired into the pseudo-random pattern generating circuits, which are typically manufactured in large quantities. Moreover, the pseudo-random patterns are of finite length, and repeat cyclically. Under these conditions, it is difficult to ensure that an intercepted transmission cannot be descrambled by the intercepting party, who may be in possession of equipment with a similar pseudo-random pattern generating circuit. The only defense is to use a very long pseudo-random pattern, but this requires a comparatively large and therefore expensive pseudo-random pattern generating circuit, and leads to difficulties in maintaining synchronization between the pseudo-random patterns generated in the first and second devices 220, 280.

A known solution to these problems is given in Japanese Unexamined Patent Application No. 05-007202, which discloses an encrypted transmission system that is both simpler and more secure. In place of the pseudo-random patterns employed in FIG. 8, this system uses signal A to encrypt signal B, and signal B to encrypt signal A.

Referring to FIG. 9, this system comprises a first device 200 and a second device 260 linked by a communication channel 300. The transmitting section of the first device 200 includes a converter 201 that uses a received signal B' as an encryption key to convert a transmit signal A to an encrypted signal CA, and a transmitting circuit 203 that converts the encrypted signal CA to a modulated signal MCA for transmission on the communication channel 300. The receiving section includes a receiving circuit 210 that receives and demodulates a modulated signal MCB and outputs an encrypted signal CB, a deconverter 211 that decrypts the encrypted signal CB to obtain the receive signal B', and a memory 202 that stores the transmit signal A sent to the converter 201 and supplies the stored signal A as a decryption key to the deconverter 211.

The second device 260 has a similar structure. Its transmitting section includes a converter 261 that uses a received signal A' as an encryption key to convert a transmit signal B to an encrypted signal CB, and a transmitting circuit 263 that converts the encrypted signal CB to a modulated signal MCB for transmission on the communication channel 300. The receiving section includes a receiving circuit 270 that receives and demodulates a modulated signal MCA and outputs an encrypted signal CA, a deconverter 271 that decrypts the encrypted signal CA to obtain the receive signal A', and a memory 262 that stores the transmit signal B and supplies it as a decryption key to the deconverter 271.

Because it uses the receive signals A' and B' as encryption keys, and the transmit signals A, B as decryption keys, this system does not require separate circuits for generating pseudo-random patterns. A high level of security is provided, even if a simple encryption procedure is used, because the encryption and decryption keys are constantly changing. Encryption by the exclusive logical OR operation, for example, provides better security in FIG. 9 than in FIG. 8.

The system in FIG. 9 has the disadvantage, however, of requiring synchronization between the transmit signals, so it cannot be used when A and B are intermittent signals.

If the first device 200 encrypts the transmit signal A by performing exclusive logical OR operations, for example, then for each bit of A, the converter 201 uses a corresponding bit of the receive signal B'. If the second device 260 transmits signal B intermittently, the required bits of the receive signal B' may not be available when they are needed. Similarly, if signal A is not transmitted continuously (A1, A2, A3, ...), the receive signal A' may not be available when needed for encrypting transmit signal B.

The system shown in FIG. 9, accordingly, cannot be used in packet communication systems, which include the numerous systems employing the internet protocol (IP).

SUMMARY OF THE INVENTION

An object of the present invention is to protect the privacy of signals that are transmitted intermittently.

When a signal is transmitted from a first device to a second device according to the invention, the first device generates an encryption key from the signal, delays the encryption key with respect to the signal, and uses the delayed encryption key to encrypt the signal. When the second device receives the encrypted signal, it uses a delayed decryption key to decrypt the encrypted signal, generates a decryption key from the decrypted signal, and delays the decryption key with respect to the decrypted signal, thereby obtaining the delayed decryption key.

Because the encryption and decryption keys are generated from the signal itself, the signal may be transmitted intermittently. In particular, the signal may be transmitted in a series of packets.

The second device preferably detects transmission errors in the encrypted signal, and transmits an initialization control signal to the first device when a transmission error is detected. Upon receiving the initialization control signal, the first device initializes the encryption key. The first device then preferably transmits an initialization reply signal to the second device. Upon receiving the initialization reply signal, the second device initializes the decryption key.

The first and second devices may also generate a pseudorandom pattern, by which the signal is scrambled before encryption in the first device, and by which the decrypted signal is descrambled in the second device.

DETAILED DESCRIPTION OF THE INVENTION

Embodiments of the invention will be described with reference to the attached drawings.

Figure 1:
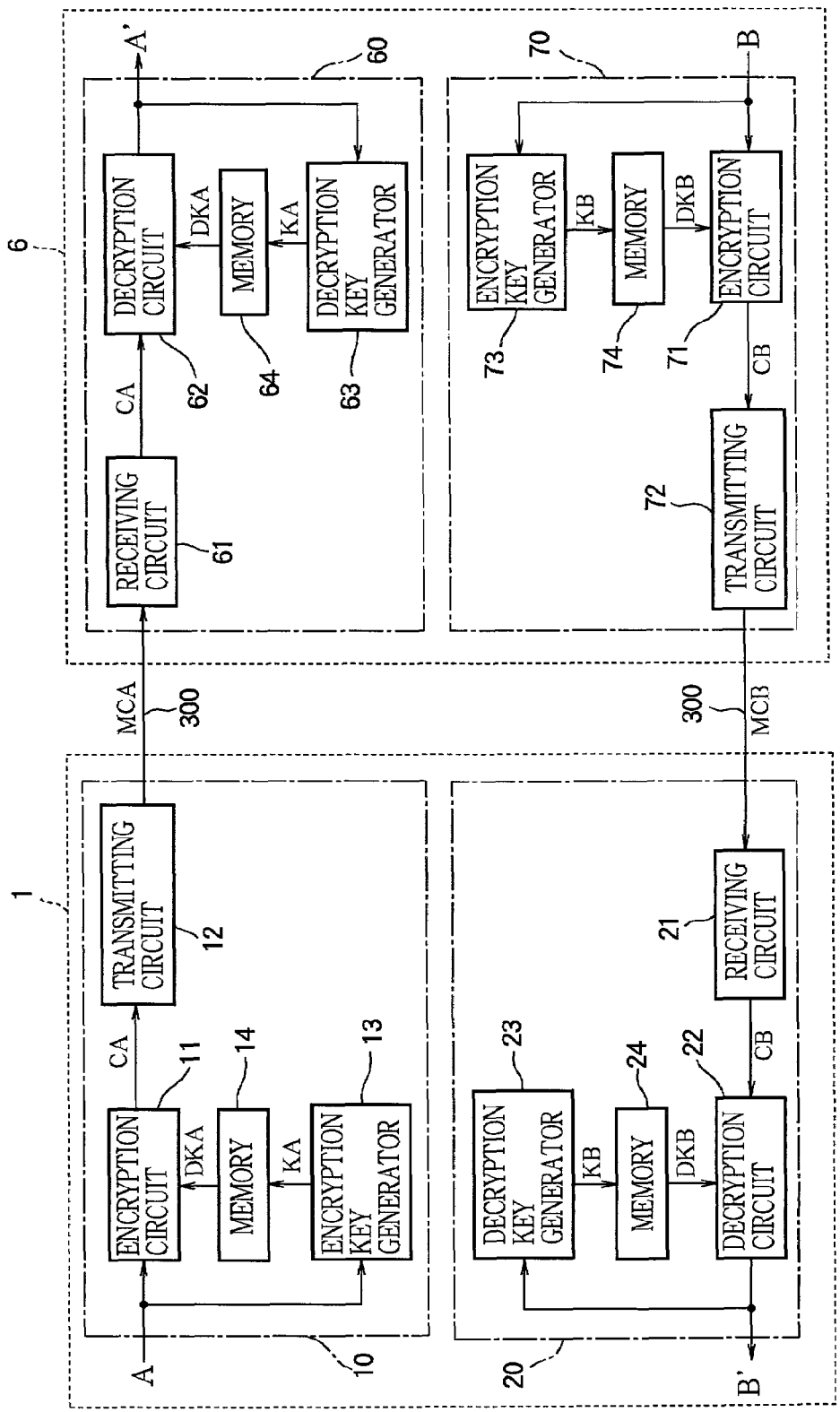
FIG. 1 is a block diagram of a transmission system embodying the invention.

The first embodiment, shown in FIG. 1, comprises a first device 1 having a transmitting section 10 and a receiving section 20, a second device 6 having a receiving section 60 and a transmitting section 70, and a bi-directional communication channel 300 linking the first device 1 and second device 6.

The transmitting section 10 comprises an encryption circuit 11, a transmitting circuit 12, an encryption key generator 13, and a memory 14. The transmitting section 10 receives a transmit signal A comprising successive packets, which arrive intermittently and are supplied to the encryption circuit 11 and encryption key generator 13. From the transmit signal A, the encryption key generator 13 generates an encryption key KA. The encryption key KA is a signal similar to the transmit signal A, divided into packets. The encryption key KA is stored in the memory 14 and thereby delayed. The encryption circuit 11 reads the delayed encryption key DKA from the memory 14 and uses it to encrypt the transmit signal A. The transmitting circuit 12 receives the encrypted signal CA and converts it to a modulated signal MCA for transmission on the communication channel 300.

The receiving section 20 comprises a receiving circuit 21, a decryption circuit 22, a decryption key generator 23, and a memory 24. The receiving circuit 21 receives a modulated signal MCB from the communication channel 300 and demodulates it. The resulting demodulated signal is an encrypted signal CB, which comprises successive packets that are received intermittently. The decryption circuit 22 decrypts the encrypted signal CB by use of a delayed decryption key DKB read from the memory 24, and outputs the decrypted signal as a receive signal B'. From the receive signal B', the decryption key generator 23 generates a decryption key KB. The memory 24 stores and thereby delays the decryption key KB, which becomes the delayed decryption key DKB.

The receiving section 60 in the second device 6 comprises a receiving circuit 61, a decryption circuit 62, a decryption key generator 63, and a memory 64, which are similar to the corresponding elements in the receiving section 20 of the first device 1. The receiving circuit 61 receives the modulated signal MCA and outputs an encrypted signal CA, which is decrypted by the decryption circuit 62 to obtain a receive signal A'. The decryption key generator 63 generates an encryption key KA from the receive signal A', and the memory 64 stores the encryption key KA, supplying a delayed encryption key DKA to the decryption circuit 62. The transmitting section 70 comprises an encryption circuit 71, a transmitting circuit 72, an encryption key generator 73, and a memory 74, which are similar to the corresponding elements in the transmitting section 10 of the first device 1. The encryption circuit 71 encrypts a transmit signal B, which comprises intermittent packets. The transmitting circuit 72 modulates the signal MCB according to the encrypted signal CB. The encryption key generator 73 converts the transmit signal B to an encryption key KB, which is stored in the memory 74 and supplied to the encryption circuit 71 as a delayed encryption key DKB.

Various encryption methods can be employed, such as the exclusive logical OR method mentioned above, or another method involving reversible arithmetic and logic operations. Signals A and B may be encrypted by different methods.

Various methods can be used to generate encryption and decryption keys from the transmit and receive signals. For example, the order of bits in the transmit and receive signals can be permuted according to a fixed rule to generate the encryption and decryption keys.

Figure 2:
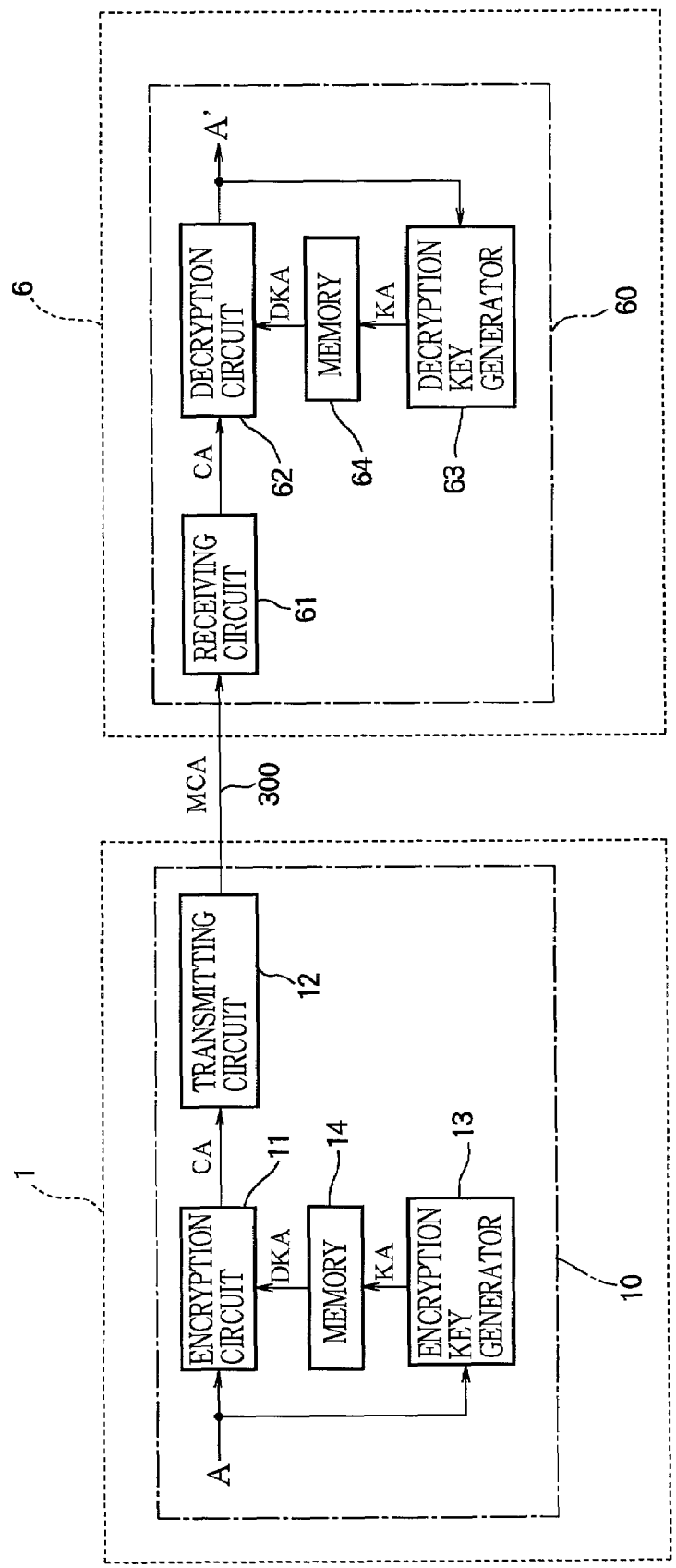
FIG. 2 is a block diagram illustrating a uni-directional version of the transmission system in FIG. 1.

The transmission and reception of signal A are independent of the transmission and reception of signal B. If the receiving section 20 and transmitting section 70 are eliminated, as shown in FIG. 2, the resulting system is still capable of transmitting signal A in encrypted form from the first device 1 to the second device 6. The following description will be confined to the simplified uni-directional system shown in FIG. 2, but the description applies equally to the transmission of signal B in FIG. 1.

Initially, the memories 14, 64 store predetermined initial key values, such as all-zero values. Upon receiving the first packet of a transmission, the encryption circuit 11 reads the initial key value from the memory 14 and uses it to generate the first encrypted packet. At the same time, the encryption key generator 13 uses the first packet to generate a new encryption key, which is then stored in the memory 14. The first encrypted packet is transmitted to the second device 6 and decrypted by use of the initial key stored in memory 64. The decryption key generator 63 generates a new decryption key from the decrypted packet, and stores it in memory 64.

Figures 3A, 3B, 3C:
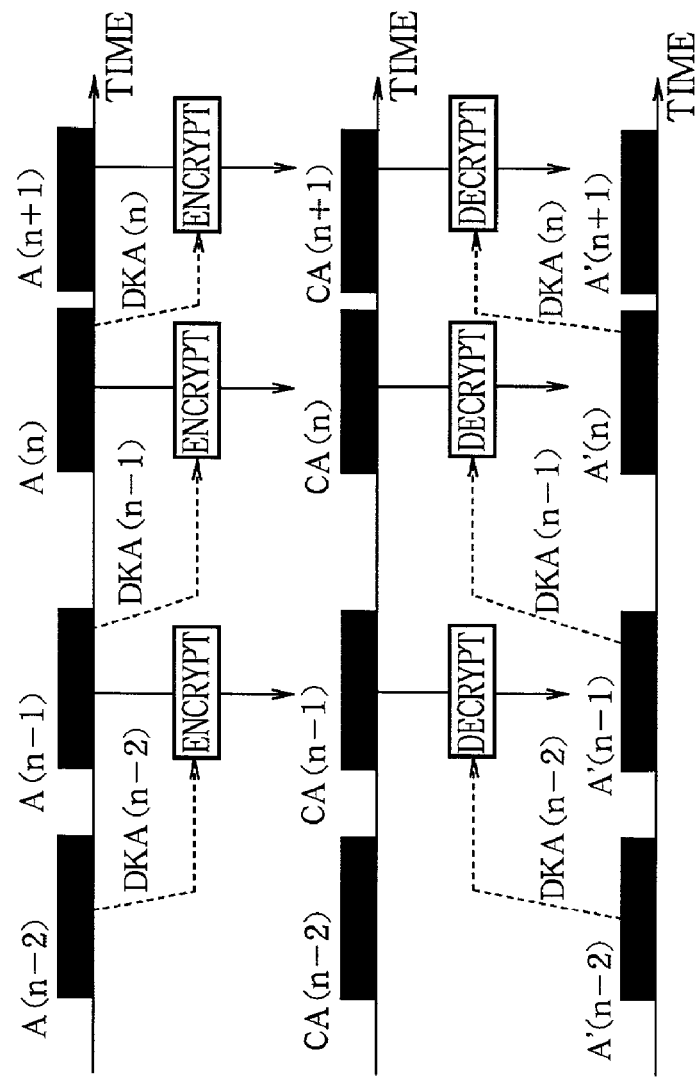
FIGS. 3A, 3B, and 3C illustrate the operation of the transmission system in FIG. 2.

This process continues. FIG. 3A illustrates four successive packets A(n−2), A(n−1), A(n), A(n+1) of transmit signal A, where n is an arbitrary integer equal to or greater than three. As shown, the packets may be separated by unequal gaps of arbitrary length. FIG. 3B illustrates the corresponding encrypted packets CA(n−2) to CA(n+1); FIG. 3C illustrates the corresponding received packets A'(n−2) to A'(n+1).

When the encryption circuit 11 receives packet A(n−2), it uses the key currently stored in memory 14 as an encryption key to generate an encrypted signal CA(n−2). At the same time, the encryption key generator 13 uses packet A(n−2) to generate a new encryption key KA(n−2). Next, this encryption key KA(n−2) is stored in the memory 14, and the transmitting circuit 12 converts the encrypted signal CA(n−2) to a modulated signal MCA(n−2).

In the second device 6, the receiving circuit 61 demodulates the modulated signal MCA(n−2) to obtain the encrypted signal CA(n−2). The key currently stored in memory 64 matches the key that was read from memory 14 during the encryption of signal A(n−2). The decryption circuit 62 uses this key to decrypt the encrypted signal CA(n−2), obtaining a receive packet A'(n−2) identical to the transmit packet A(n−2). The decryption key generator 63 generates a decryption key KA(n−2) from the receive signal A'(n−2), and stores it in memory 64. The decryption key KA(n−2) is identical to the encryption key KA(n−2) generated by the encryption key generator 13 in the first device 1.

When the encryption circuit 11 receives the next packet A(n−1), it uses the key now stored in memory 14 as an encryption key to generate an encrypted signal CA(n−1). This key is denoted DKA(n−2) in FIGS. 3A and 3B, although it is identical to the key KA(n−2) written previously by the encryption key generator 13. The corresponding modulated signal MCA(n−1) is transmitted on the communication channel 300 to the second device 6, and demodulated by the receiving circuit 61, which outputs the encrypted signal CA(n−1). The decryption circuit 62 uses the key now stored in memory 64, denoted DKA(n−2) but identical to the key KA(n−2) written previously by the decryption key generator 63, to decrypt the encrypted signal CA(n−1) and obtain the next receive packet A'(n−1).

In the meantime, the encryption key generator 13 in the first device 1 generates the next encryption key KA(n−1) from packet A(n−1) and stores it in memory 14. The decryption key generator 63 in the second device 6 generates an identical decryption key KA(n−1) from the receive packet A'(n−1) and stores it in memory 64.

Packet A(n) is now encrypted by use of delayed key DKA(n−1), identical to KA(n−1), and the encrypted signal CA(n) is decrypted by use of the same delayed key DKA (n−1) to obtain receive packet A'(n). New keys KA(n) are generated from A(n) and A'(n) and stored in the memories 14, 64. Then packet A(n+1) is encrypted by use of delayed key DKA(n), identical to KA(n), and the encrypted signal CA(n+1) is decrypted by use of the same delayed key DKA(n) to obtain receive packet A'(n+1). In other words, after the first packet, each packet is encrypted and decrypted by use of a key generated from the preceding packet.

This system is simple because it generates key information from the transmit and receive signals, and therefore does not require circuitry to generate random patterns. The system is secure in that the key is constantly changing. Moreover, the system enables a signal transmitted from the first device 1 to the second device 6 to be encrypted and decrypted without reliance on a signal transmitted from the second device 6 to the first device 1, so it is particularly useful in packet transmission systems and other intermittent transmission systems.

Figure 4:
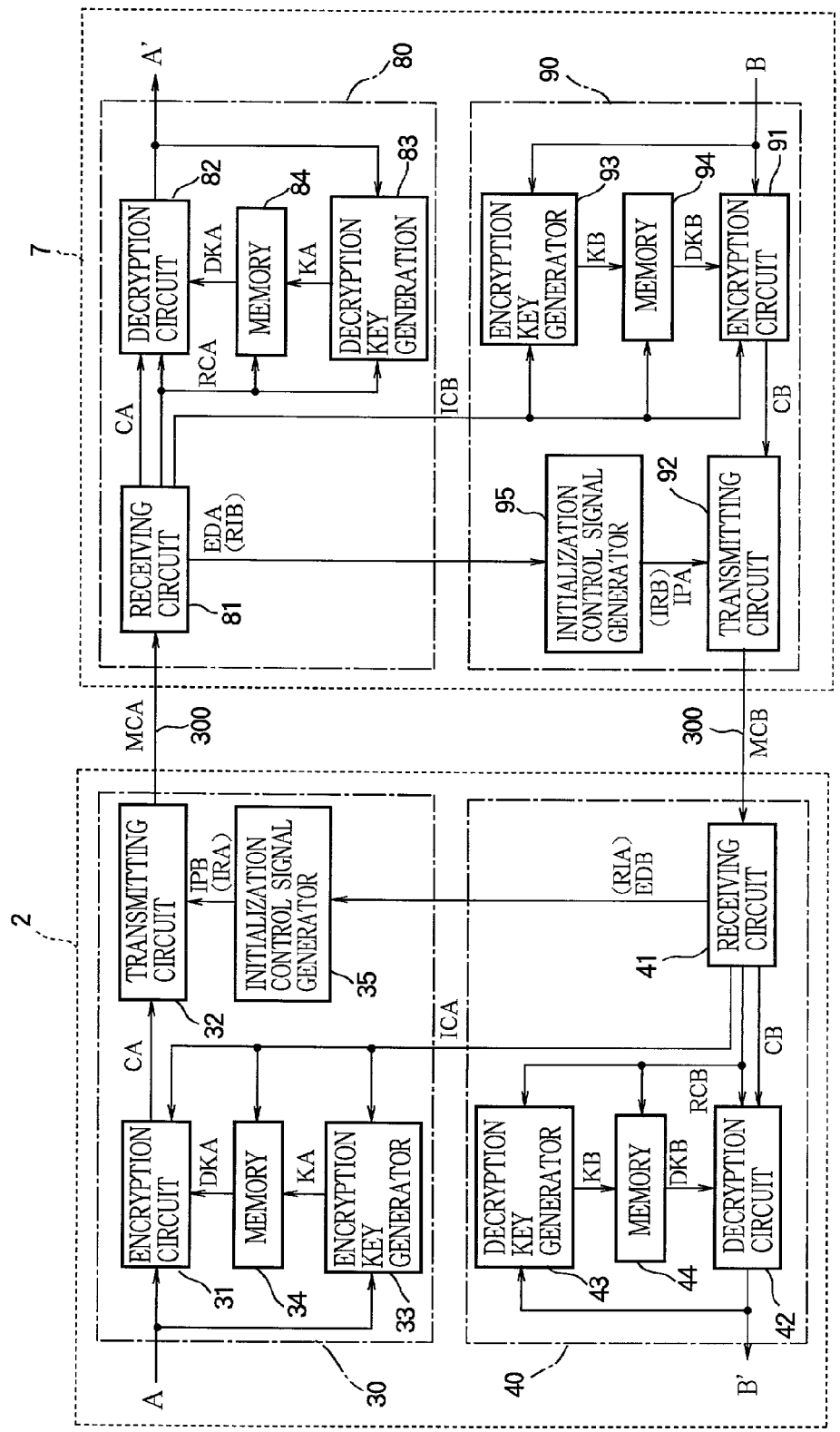
FIG. 4 is a block diagram of another transmission system embodying the invention.

As a second embodiment of the invention, FIG. 4 shows a system comprising a first device 2 having a transmitting section 30 and a receiving section 40, and a second device 7 having a receiving section 80 and a transmitting section 90. These sections and their constituent elements are equivalent to the corresponding elements in the first embodiment, but with additional functions and elements for detecting transmission errors and sending and receiving initialization command, control, and reply signals.

The transmitting section 30 in the first device 2 has an encryption circuit 31, a transmitting circuit 32, an encryption key generator 33, a memory 34, and an initialization control signal generator 35. The initialization control signal generator 35 receives an error detection signal EDB from the receiving section 40, and supplies a corresponding initialization control signal IPB to the transmitting circuit 32 for transmission on the communication channel 300. IPB is supplied and transmitted as a packet. The initialization control signal generator 35 also receives a report-of-initialization signal (RIA) from the receiving section 40, and supplies a corresponding initialization reply signal (IRA) to the transmitting circuit 32 for transmission as a packet on the communication channel 300.

The receiving section 40 has a receiving circuit 41, a decryption circuit 42, a decryption key generator 43, and a memory 44. The receiving circuit 41 tests the validity of a frame check sequence (FCS) included in each packet to detect transmission errors, and generates the error detection signal EDB when an invalid FCS is detected. If the receiving circuit 41 receives an initialization control packet IPA from the second device 7, it sends an initialization command ICA to the encryption circuit 31, encryption key generator 33, and memory 34 in the transmitting section 30. If the receiving circuit 41 receives an initialization reply signal (IRB) from the second device 7, it sends an initialization command RCB to the decryption circuit 42, decryption key generator 43, and memory 44.

The receiving section 80 in the second device 7 has a receiving circuit 81, decryption circuit 82, decryption key generator 83, and memory 84, which are similar to the corresponding elements in the receiving section 40 in the first device 2. The transmitting section 90 in the second device 7 has an encryption circuit 91, a transmitting circuit 92, an encryption key generator 93, a memory 94, and an initialization control signal generator 95 which are similar to the corresponding elements in the transmitting section 30 in the first device 2. The receiving circuit 81 generates an error detection signal EDA, a report-of-initialization signal (RIB), and initialization command signals RCA and ICB. The initialization control signal generator 95 generates an initialization control signal IPA and an initialization reply signal (IRB).

Figure 5:
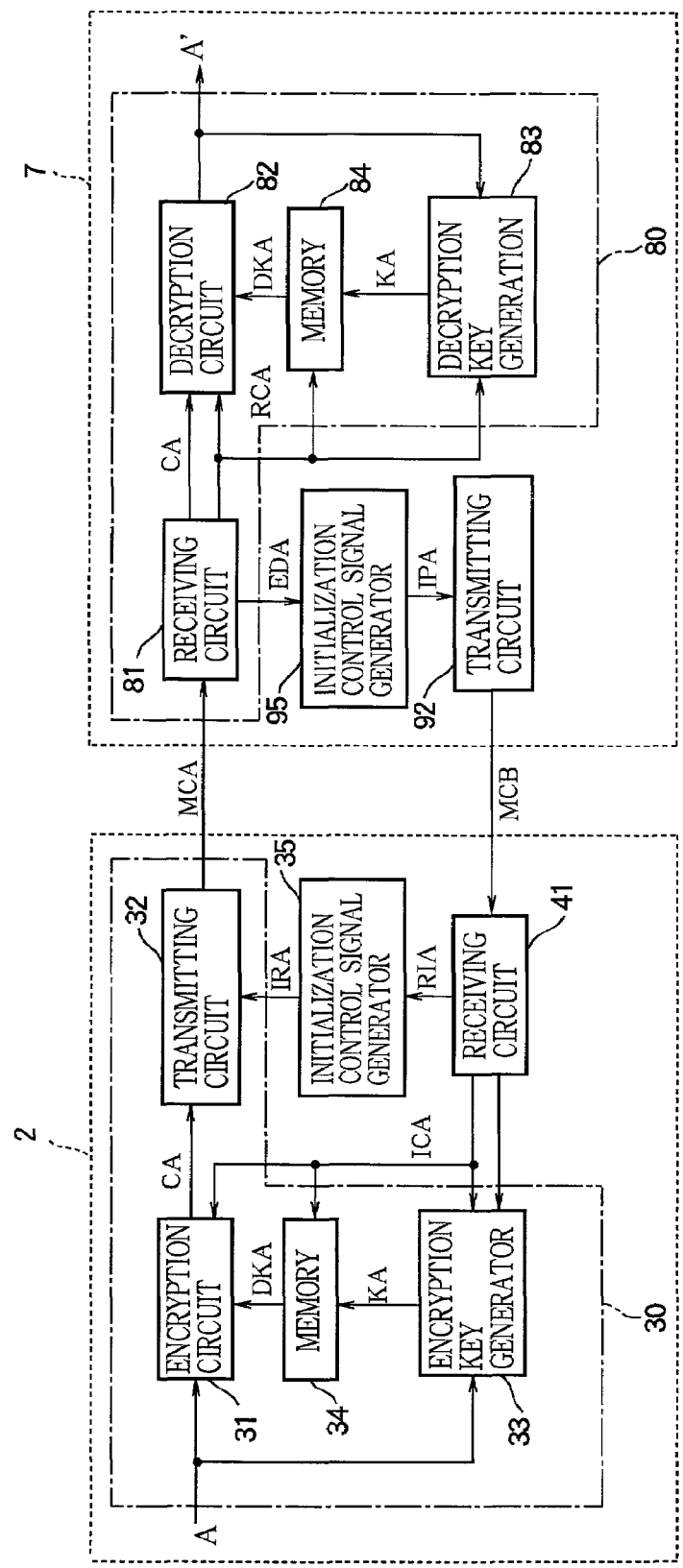
FIG. 5 is a block diagram illustrating a uni-directional version of the transmission system in FIG. 4.

The system in FIG. 4 is bi-directional, transmitting a signal A from the first device 2 to the second device 7, and a signal B from the second device 7 to the first device 2. FIG. 5 shows a variation of the second embodiment adapted for transmission of signal A without transmission of signal B. The first device 2 includes the encryption circuit 31, transmitting circuit 32, encryption key generator 33, memory 34, initialization control signal generator 35, and receiving circuit 41 of FIG. 4, the initialization control signal generator 35 now being external to the transmitting section 30. The second device 7 includes the receiving section 80, transmitting circuit 92, and initialization control signal generator 95 of FIG. 4. The operation of the second embodiment will be described in relation to the variation in FIG. 5, but similar operations take place when signal B is transmitted in FIG. 4.

Figure 6:
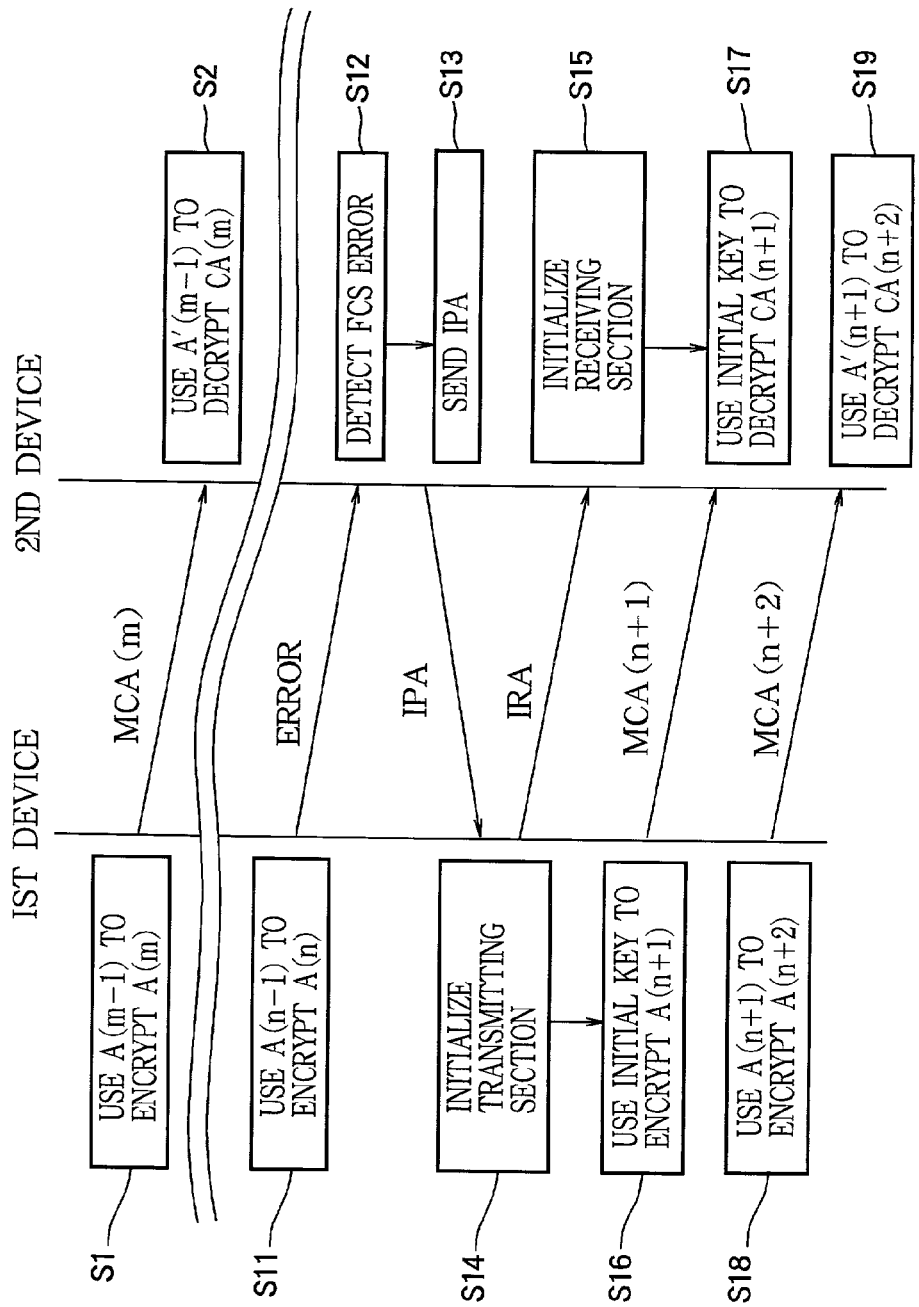
FIG. 6 is a communication sequence diagram illustrating the operation of the transmission system in FIG. 5.

FIG. 6 depicts the operation from a point at which a packet A(m) is encrypted in the first device 2, using a key generated from the preceding packet A(m−1) as described in the first embodiment (step S1). The encrypted packet CA(m) is transmitted as a modulated signal MCA(m) to the second device 7 and decrypted using the same key, which is generated from the preceding received packet A'(m−1), as also described in the first embodiment (step S2). This process continues as long as no transmission errors are detected.

If at some point a packet A(n) encrypted by the first device 2 (step 11) is corrupted in transmission, the error is detected by the FCS check performed by the receiving circuit 81 in the second device 7 (step S12). The receiving circuit 81 then sends an error detection signal EDA to the initialization control signal generator 95. The initialization control signal generator 95 generates an initialization control signal IPA and supplies it as a maintenance packet to the transmitting circuit 92 (step 13). The transmitting circuit 92 transmits this IPA packet to the first device 2.

If the IPA packet is received without error, the receiving circuit 41 in the first device 2 sends an initialization command signal ICA to the encryption circuit 31, encryption key generator 33, and memory 34, thereby initializing the transmitting section 30 (step S14). At the same time, the receiving circuit 41 reports the reception of the IPA packet by sending a report-of-initialization signal RIA to the initialization control signal generator 35, which generates an initialization reply signal IRA and supplies it as a maintenance packet to the transmitting circuit 32. The transmitting circuit 32 transmits this IRA packet to the second device 7.

If the IRA packet is received without error, the receiving circuit 81 in the second device 7 sends an initialization command signal RCA to the decryption circuit 82, decryption key generator 83, and memory 84, thereby initializing the receiving section 80 (step S15). Thus IPA is the trigger for initialization of the transmitting section 30, while IRA is the trigger for initialization of the receiving section 80. After this initialization, both memories 34, 84 hold the same initial key value, such as an all-zero value.

The encryption circuit 31 in the first device 2 now encodes the next packet A(n+1), using the initial key (step S16). The encrypted packet CA(n+1) is transmitted as a modulated signal MCA(n+1) to the second device 7 and decrypted, using the same initial key (step S17).

The next packet A(n+2) is encrypted in the normal way in the first device 2, using a key generated from the preceding packet A(n+1) (step S18). In the second device 7, the encrypted packet CA(n+2) is decrypted by use of a key generated from the preceding received packet A'(n+1) (step S19).

The second embodiment provides a way to recover from transmission errors without retransmitting the erroneous packet. The second embodiment is particularly useful in systems that must operate in real time and cannot afford to retransmit erroneous packets.

If the system provides for retransmission of erroneous packets, either the first or the second embodiment can be employed.

In a variation of the second embodiment, the receiving circuit 81 also detects missing packets, by use of packet serial numbers, for example, and generates an error detection signal EDA when a packet is either corrupted or missing.

Figure 7:
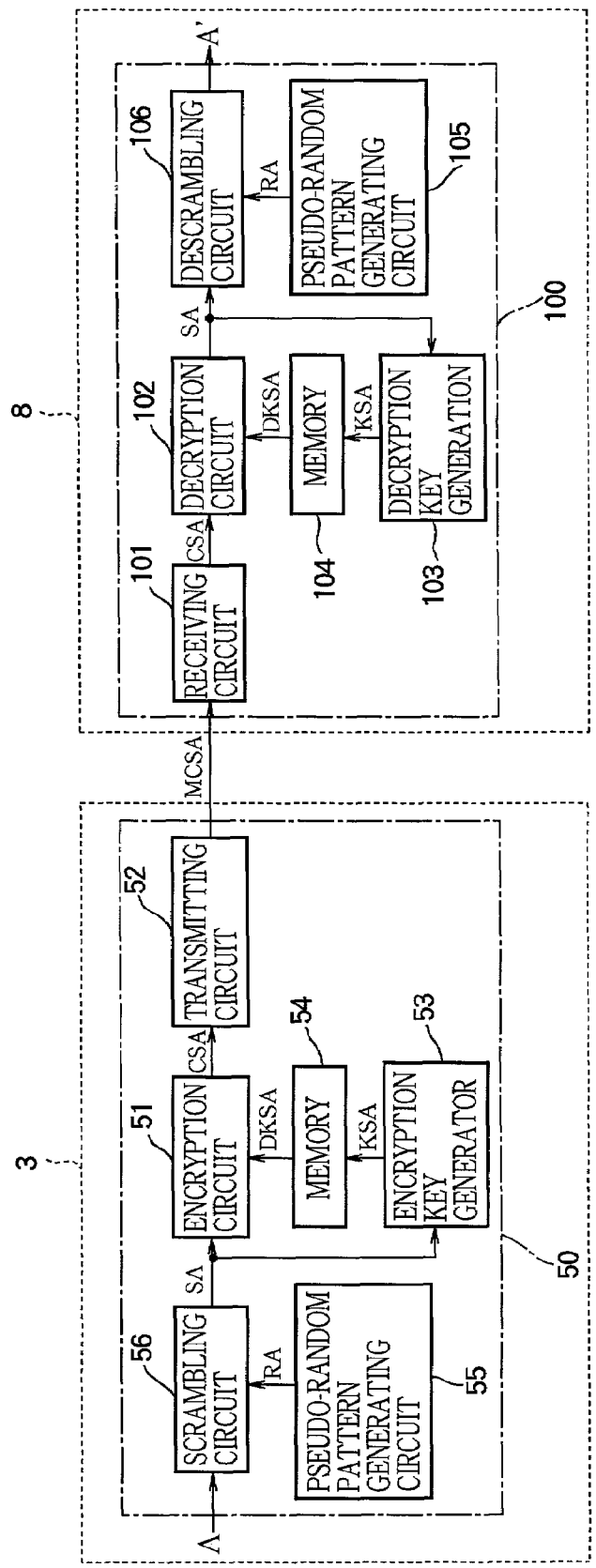
FIG. 7 is a block diagram of yet another transmission system embodying the invention.
Figure 8:
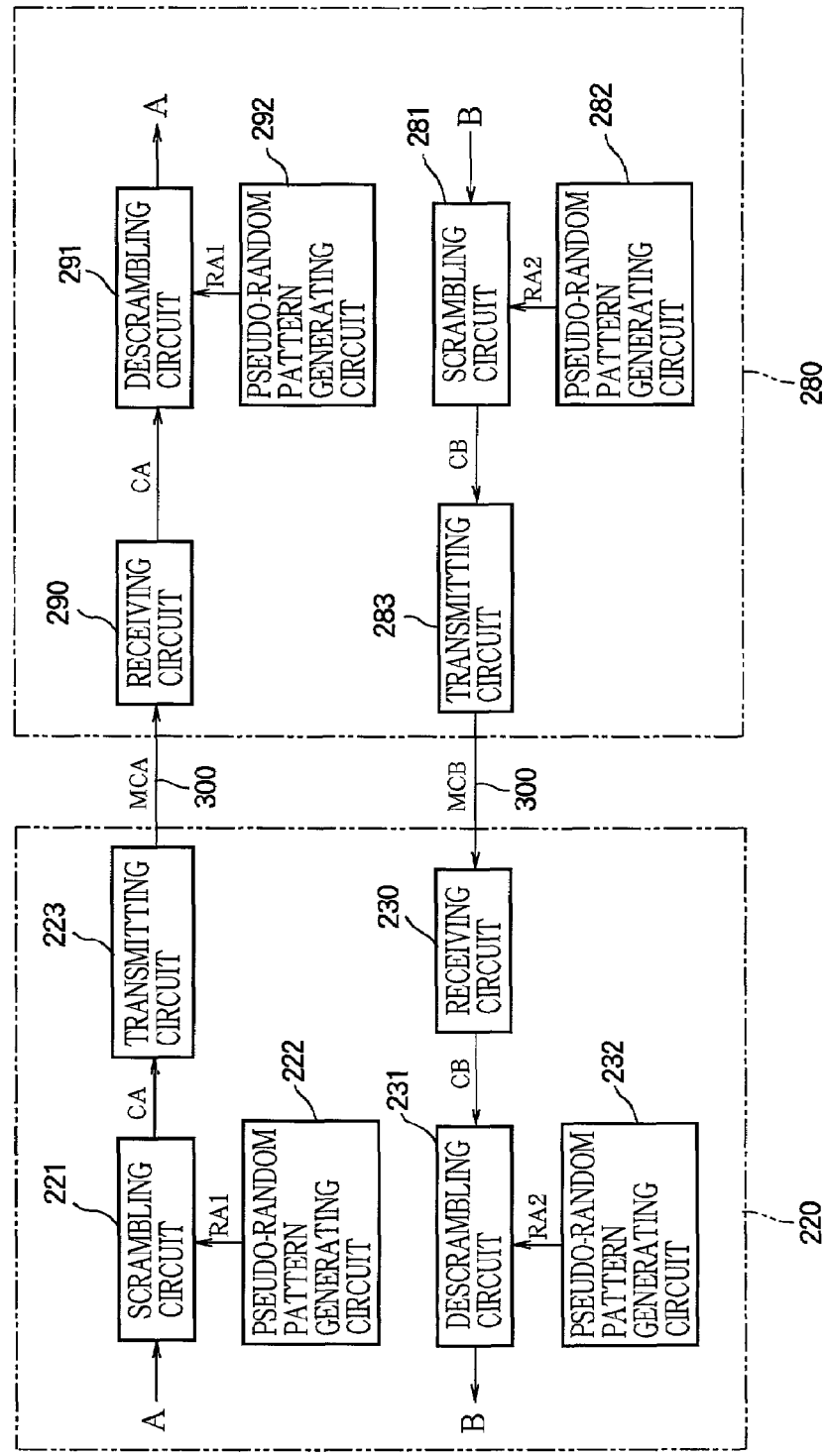
FIG. 8 is a block diagram of a conventional transmission system.
Figure 9:
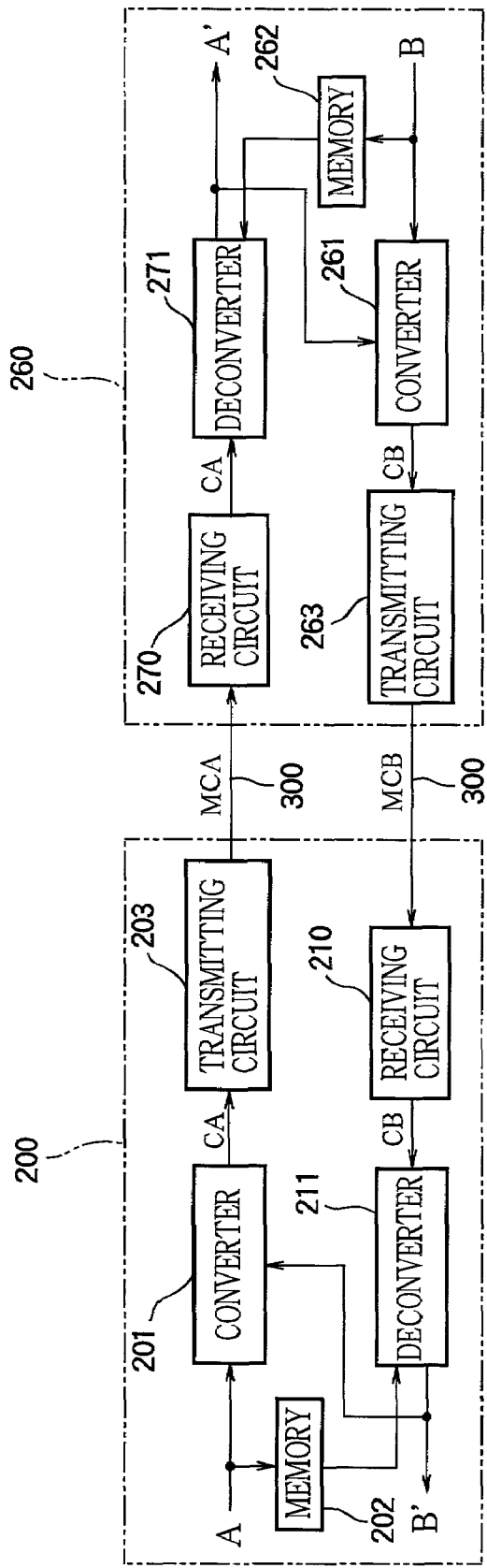
FIG. 9 is a block diagram of another conventional transmission system.

As a third embodiment of the invention, FIG. 7 shows a uni-directional transmission system comprising a first device 3 having a transmitting section 50, and a second device 8 having a receiving section 100.

The transmitting section 50 comprises an encryption circuit 51, a transmitting circuit 52, an encryption key generator 53, and a memory 54, which are similar to the corresponding elements in the first embodiment, and a pseudo-random pattern generating circuit 55 and scrambling circuit 56. The receiving section 100 comprises a receiving circuit 101, a decryption circuit 102, a decryption key generator 103, and a memory 104, which are similar to the corresponding elements in the first embodiment, and a pseudo-random pattern generating circuit 105 and descrambling circuit 106. The two pseudo-random pattern generating circuits 55, 105 generate identical pseudo-random patterns RA.

The transmit signal A received by the transmitting section 50 is first scrambled by the scrambling circuit 56, using the pseudo-random pattern RA supplied by the pseudo-random pattern generating circuit 55. Various well-known scrambling methods can be used, such as the exclusive logical OR method described above. The resulting scrambled signal SA is then encrypted by the encryption circuit 51, using a delayed encryption key DKSA read from the memory 54. The transmitting circuit 52 converts the encrypted signal CSA to a modulated signal MCSA for transmission to the second device 8. The encryption key generator 53 generates a new key KSA from the scrambled signal SA, and stores the new key in the memory 54, from which it will be read as the delayed encryption key DKSA for the next scrambled packet.

In the second device 8, the receiving circuit 101 demodulates the modulated signal MCSA to obtain the encrypted signal CSA, which is decrypted by the decryption circuit 102, using a delayed decryption key DKSA read from the memory 104. The decrypted signal is the scrambled signal SA, from which the decryption key generator 103 generates a new decryption key KSA. The new decryption key KSA is stored in the memory 104, from which it will be read as the next delayed decryption key. The scrambled signal SA is descrambled by the descrambling circuit 106, using the pseudo-random pattern RA supplied by the pseudo-random pattern generating circuit 105, to obtain the receive signal A'.

In the first and second embodiments, a party intercepting the communication between the first device and the second device may attempt to decrypt each packet on the assumption that it was encrypted with the initial key value. In this way, the intercepting party may succeed in decrypting the first packet transmitted in the first embodiment, or a packet transmitted after a transmission error in the second embodiment. If the decrypted packet includes a text message, for example, the intercepting party will know that he has decrypted the packet successfully because the decrypted message will be in plain text. The intercepting party may then be able to determine how the key is generated and decrypt the succeeding packets as well.

In the third embodiment, even if an intercepted packet is correctly decrypted, the intercepting party obtains only a scrambled message, and cannot easily recognize that the packet has been decrypted correctly. This makes it extremely difficult for the intercepting party to determine how the key is generated, and how the packets have been scrambled.

The third embodiment accordingly provides a higher level of security than the first and second embodiments. This higher level of security can moreover be obtained with a comparatively short pseudo-random pattern, because the key changes from packet to packet, so that even if two packets are scrambled in the same way, they will not be encrypted in the same way. Differing from the prior art, the third embodiment does not require long pseudo-random patterns or complex and expensive pseudo-random pattern generating circuits in order to protect the privacy of communications.

The third embodiment can be modified for bi-directional communication, by adding a receiving section to the first device 3 and a transmitting section to the second device 8.

The third embodiment can also be varied by providing for initialization in case of transmission errors, as in the second embodiment.

In the description of the first embodiment, the delay of the encryption and decryption keys in the memories 14, 64 was assumed to be equal to the length of one packet, but this is not a requirement. The delay can have any fixed value, expressed as a fixed number of bits with respect to the transmit and receive signals.

In the description of the first embodiment, the packets were implicitly assumed to be of equal length, but this is not a requirement either. The packets may have variable length.

The encryption key used to encrypt the transmit signal need not be identical to the decryption key used to decrypt the encrypted signal. The decryption key may be complementary to the encryption key, for example.

Any of the preceding embodiments can be modified for communication among more than two devices. The invention can be used in a packet-switching network, for example.

The invention can also be used in systems that transmit signals continuously, instead of intermittently. The invention is particularly useful in uni-directional systems, as illustrated in FIGS. 2 and 5.

Those skilled in the art will recognize that further variations are possible within the scope claimed below.

What is claimed is:

1. A system for transmitting a signal from a first device to a second device, the system including a transmitting section disposed in the first device and a receiving section disposed in the second device, the transmitting section comprising:

an encryption key generator for generating an encryption key from said signal;

a memory for temporarily storing the encryption key, thereby delaying the encryption key with respect to said signal;

an encryption circuit for encrypting said signal by use of the delayed encryption key; and a transmitting circuit for transmitting the encrypted signal to the second device; the receiving section comprising;

a receiving circuit for receiving the encrypted signal from the first device;

a decryption circuit for decrypting the encrypted signal by use of a delayed decryption key;

a decryption key generator for generating a decryption key from the decrypted signal; and a memory for temporarily storing the decryption key, thereby delaying the decrypted signal and obtaining the delayed decryption key, wherein:

the receiving circuit in the receiving section in the second device detects transmission errors in the encrypted signal;

the second device has an initialization control signal generator for generating an initialization control signal when the receiving circuit detects a transmission error in the encrypted signal;

the second device also has a transmitting circuit for transmitting the initialization control signal to the first device; and the first device has a receiving circuit for receiving the initialization control signal and thereupon sending an initialization command signal to the encryption circuit, the encryption key generator, and the memory in the transmitting section.

2. The system of claim 1, wherein:

the first device has an initialization control signal generator for generating an initialization reply signal when the receiving circuit receives the initialization control signal;

the transmitting circuit transmits the initialization reply signal to the receiving circuit in the second device; and upon receiving the initialization reply signal, the receiving circuit sends an initialization command signal to the decryption circuit, the decryption key generator, and the memory in the receiving section.

3. A method of transmitting a signal from a first device to a second device, comprising the steps of:

generating an encryption key from said signal;

delaying the encryption key with respect to said signal, thus obtaining a delayed encryption key;

encrypting said signal by use of the delayed encryption key, thus obtaining an encrypted signal;

transmitting the encrypted signal from the first device to the second device;

decrypting the encrypted signal by use of a delayed decryption key, thus obtaining a decrypted signal;

generating a decryption key from the decrypted signal;

delaying the decryption key with respect to the decrypted signal, thus obtaining the delayed decryption key;

detecting a transmission error in the encrypted signal at the second device;

transmitting an initialization control signal from the second device to the first device when the transmission error is detected; and initializing the encryption key when the first device receives the initialization control signal.

4. The method of claim 3, further comprising the steps of:

transmitting an initialization reply signal from the first device to the second device when the first device receives the initialization control signal; and initializing the decryption key when the second device receives the initialization reply signal.

* * * * *